No. 897,495.
W. SCHULTHESS.
APPARATUS FOR THE PRODUCTION OF HYDRATE OF LIME.
APPLICATION FILED SEPT. 16, 1907.
PATENTED SEPT. 1, 1908.
2 SHEETS—SHEET 1.
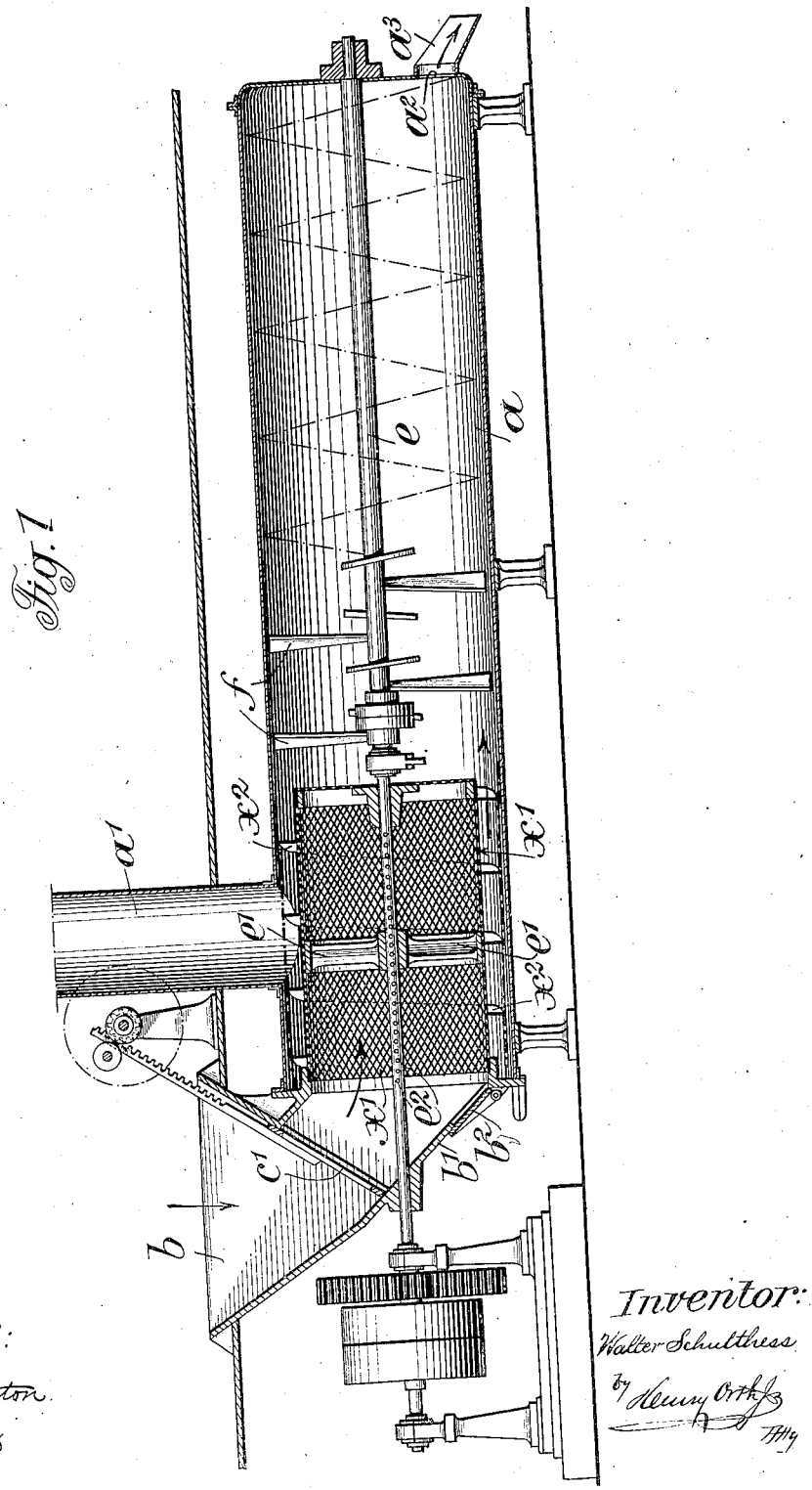

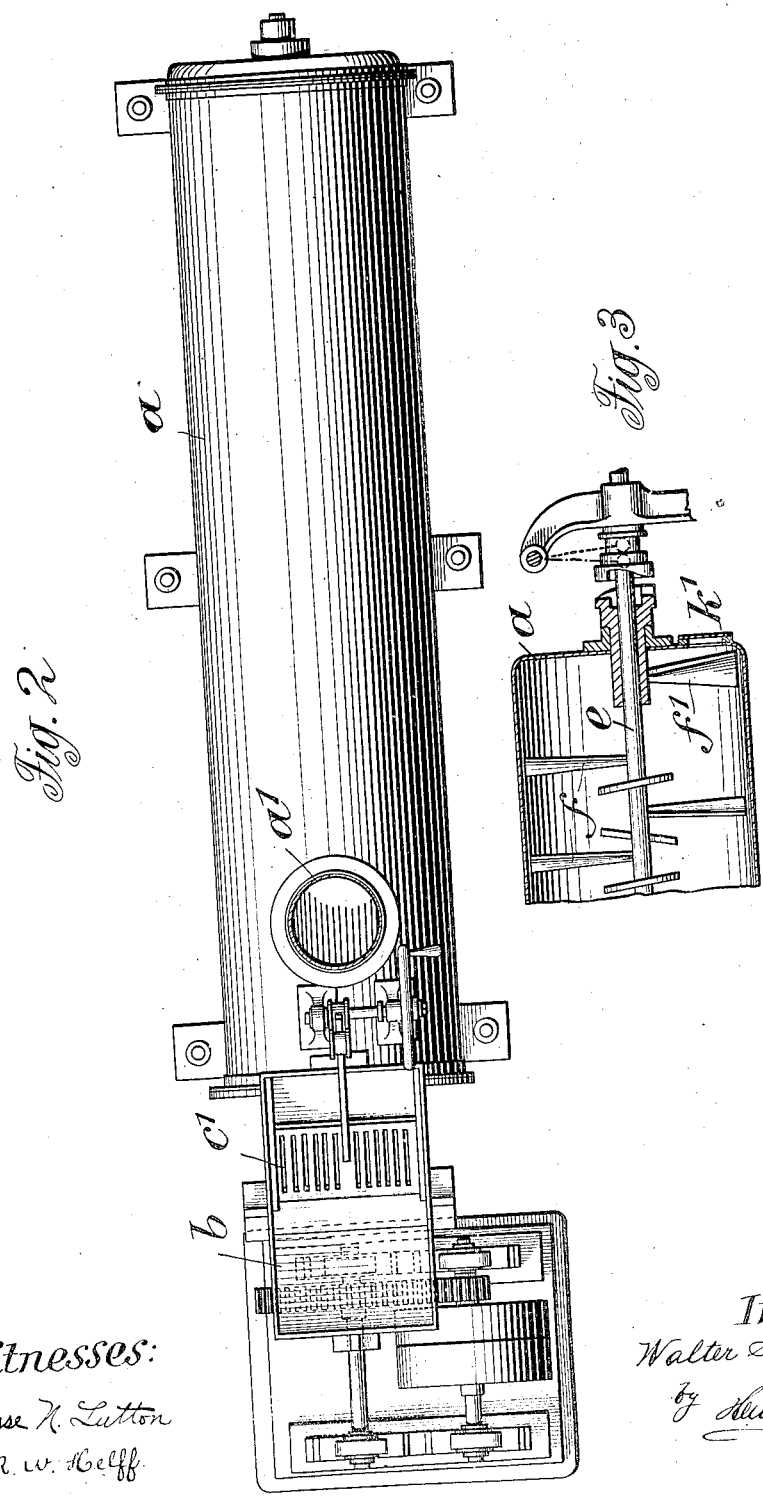

UNITED STATES PATENT OFFICE.

WALTER SCHULTHESS, OF PARIS, FRANCE.

APPARATUS FOR THE PRODUCTION OF HYDRATE OF LIME.

No. 897,495.

Specification of Letters Patent.

Patented Sept. 1, 1908.

Application filed September 16, 1907. Serial No. 393,093.

*To all whom it may concern:*

Be it known that I, WALTER SCHULTHESS, a citizen of the Republic of Switzerland, residing at Paris, in France, have invented certain new and useful Improvements in Apparatus for the Production of Hydrate of Lime; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Apparatus for the production of dry, pulverulent hydrate of lime, comprising a slaking receptacle provided with a charging hopper, a water supply arrangement, and mixing apparatus, and which is also adapted to be heated by a steam jacket, are known.

The subject matter of the present invention is a similar apparatus, which, in comparison with the constructions already known, is distinguished by the compactness of its construction, its great simplicity and by the small consumption of power required to operate it. Moreover the apparatus, as hereinafter described, is at the same time so constructed, that by its use not only dry but also pasty hydrate of lime can be prepared and therefore the steam heating jacket of the older constructions may be omitted, as in the example hereinafter described with reference to the accompanying drawings, although it should be stated that the improved apparatus can be provided with a double wall or heating jacket if desired.

Referring to such drawings, Figure 1 shows in vertical longitudinal section, and Fig. 2 in plan, one construction of apparatus according to this invention. Fig. 3 is a vertical section illustrating a modification.

$a$ is the cylindrical slaking receptacle, $b$ the charging hopper and $e$ the shaft of the mixing apparatus which carries mixing and transporting blades $f$. Upon the shaft $e$ is also fixed on the part adjacent to the charging hopper $b$ a coarse meshed sieve $x^1$ in the form of a cylindrical receptacle open towards the charging hopper or towards the charging opening made at one end of the receptacle $a$ and arranged concentrically to the shaft $e$; the sieve has upon its external periphery a worm $x^2$ for the purpose of conveying the lime which falls through the meshes of the sieve into the rear part of the slaking apparatus.

$e^1$ are arms fixed upon the shaft $e$ which support the sieve in the middle of its length and which are constructed as mixing and transporting blades.

At the bottom of the charging hopper $b$ is arranged a movable grid $c^1$; the former is connected to the slaking receptacle $a$ by a socket $b^1$; a flange on which tightly fits round the sieve end next the charging opening to prevent the lime from falling between the socket and the front piece of the sieve and consequently rapid wearing out of these parts during the rotation of the sieve. The socket $b^1$ is formed with an opening which is closed by a movable flap $b^2$ and through which all unslakable large pieces of lime remaining in the sieve, unburnt or too strongly burnt lime, slag, coke etc. can be periodically removed. The receptacle $a$ is furthermore provided with a vapor pipe $a^1$ placed above the sieve $x^1$, and at the end of the slaking receptacle opposite the charging opening is provided an outlet opening $a^2$ furnished with a spout $a^3$ for emptying out the slaked lime. The shaft $e$ is hollow along the whole length of the sieve $x^1$ and is formed with small openings $e^2$ which allow the water required for the slaking of the lime to be admitted in a finely divided form. The shaft can be rotated by means of a driving pulley.

The method of working with this apparatus is as follows: A definite amount of burnt lime, always the same, is introduced into the charging hopper $b$, which at such time is shut off from the sieve by means of the movable grid $c^1$; the quantity of water required for the slaking of the lime is next delivered into a receptacle not shown in the drawing. By pulling back the grid shaped slide $c^1$ the burnt lime in the charging hopper is caused to fall into the sieve $x^1$; at the same time the water contained in the water receptacle is allowed to flow through the openings $e^2$ onto the lime. The shaft $e$ is then set in rotary motion by throwing into action the driving pulley. The slaking which ensues converts the pieces of lime into a mixture of fine powder and small pieces which fall through the meshes of the sieve onto the bottom of the receptacle where by the worm $x^2$ it is fed into the rear part of the apparatus where it is mixed in the most intimate manner by the mixing and transporting blades $f$ mounted upon the shaft and under the action of the steam evolved by the process of slaking is completely slaked. The lime thus slaked passes continuously through the outlet opening $a^2$.

For the purpose of removing all foreign bodies, small pieces of unburnt lime, slag arising from the burning coke etc., the emptying spout $a^3$ is connected with a fine sieve not shown in the drawing and through which the lime falls on its exit as dry hydrate of lime.

The slaking is accomplished by this apparatus without any production of dust, indeed it is even possible, by the use of the grid-like slide $c^1$, to avoid all production of dust even during the charging of the charging hopper $b$; in reality the heat evolved by the process of slaking causes, as soon as the apparatus is well in action, a draft of air towards the vapor pipe which draws the dust which arises up through the grid-like slide. By arranging at the end of the vapor pipe a receptacle through which the outgoing vapors are compelled to traverse in a zigzag course the hydrate of lime carried along with them can be completely kept back. This apparatus which serves for slaking at ordinary atmospheric pressure can not only be employed for the production of pulverulent or pasty hydrate of lime but also, with a few alterations, for slaking under high pressure, a method which is of advantage for certain kinds of lime. For the last named purpose the receptacle $a$ is constructed of strong sheet iron so that it can withstand a steam pressure of about 10 atmospheres; it is also provided with a steam valve, a safety valve and a pressure gage. Such apparatus, as in the example shown, will have three openings, one opposite the sieve for filling the apparatus, the second beneath the first for clearing out the unslaked portions of lime and the third at the opposite end for discharging the slaked lime, but when designed for working under high pressure these openings are adapted to be closed in a steam-tight manner furthermore, in such apparatus the socket $b^1$ is arranged to be easily removable. The shaft $e$ is provided with devices similar to those already hereinbefore mentioned and it is also provided on its end next the outlet opening with a blade $f^1$, Fig. 3, to which the rotary motion of the shaft can be imparted by means of a claw clutch operated by a suitable lever. The function of this blade is to constantly shovel away and back into the interior of the apparatus the lime which piles itself up in front of the outlet opening; without this precautionary measure the lime which piles up would bring the mixing blades to a standstill in a short time. In order to empty out the lime after slaking has taken place the blade $f^1$ is thrown out of operation and the door $k^1$ opened. The method of working with such apparatus is the same as formerly described, care being taken that the openings mentioned are carefully closed before the commencement of the slaking operation. It should also be remarked that the clearing blade $f^1$ can also be used in apparatus working under atmospheric pressure, also that the annular space bounded on the one hand by the sieve and on the other by the wall of the slaking receptacle may be slightly conical in order to facilitate the advance of the lime falling through the sieve by the worm placed upon the sieve, and that for the production of very specially dry hydrate of lime the slaking receptacle, as already stated, may be surrounded by a heating jacket.

Having now particularly described and ascertained the nature of my said invention and in what manner the same is to be performed, I declare that what I claim is:

1. In an apparatus of the character described, a stationary substantially horizontal slaking receptacle having a charging aperture in one end and a discharge aperture in the other end, a shaft extending longitudinally through the receptacle having a hollow perforated portion, a sieve adjacent the charging aperture and secured to the hollow perforated portion and rotating therewith, and transporting blades between the sieve and discharge aperture on the shaft.

2. An apparatus of the character described, comprising a fixed cylindrical slaking receptacle having a charging aperture at one end and a discharge aperture at the opposite end, a shaft extending longitudinally through the receptacle having a hollow perforated portion, a cylindrical sieve located opposite the charging aperture, a worm on the external periphery of the sieve, and transporting blades between the sieve and discharge aperture.

3. An apparatus of the character described, comprising a horizontally fixed cylindrical slaking receptacle having a charging aperture at one end and a discharge aperture at the opposite end, a hopper communicating with the charging aperture, a grid adjustably mounted in the hopper, a shaft extending longitudinally through the receptacle having a hollow perforated portion, a cylindrical sieve located opposite the charging aperture, and transporting blades on the shaft between the sieve and discharge aperture.

4. An apparatus of the character described, comprising a horizontally fixed cylindrical slaking receptacle having a charging aperture at one end and a discharge aperture at the opposite end, a hopper communicating with the charging aperture, a grid adjustably mounted in the hopper, a dust-conduit communicating with the receptacle, a shaft extending longitudinally through the receptacle having a hollow perforated portion, a cylindrical sieve located opposite the charging aperture, and transporting blades on the shaft between the sieve and discharge aperture.

5. An apparatus of the character described, comprising a cylindrical slaking receptacle having a charging aperture at one end and a discharge aperture at the opposite end, a shaft extending longitudinally through the receptacle having a hollow perforated portion, a cylindrical sieve located opposite the charging aperture, blades supporting the sieve, adapted to mix and transport the material in the latter and transporting blades on the shaft between the sieve and discharge aperture.

6. An apparatus of the character described, comprising a cylindrical slaking receptacle having a charging aperture at one end and a discharge aperture at the opposite end, a shaft extending longitudinally through the receptacle having a hollow perforated portion, a cylindrical sieve located opposite the charging aperture, transporting blades between the sieve and discharge aperture adapted to advance the contents towards the latter and a blade mounted on the shaft near the discharge aperture adapted to operate on the contents reversely to the aforesaid blades.

7. An apparatus of the character described, comprising a horizontally fixed cylindrical slaking receptacle having a charging aperture at one end and a discharge aperture at the opposite end, a hopper communicating with the charging aperture, a grid adjustably mounted in the hopper, a dust-conduit leading from the top of the receptacle, a rotatable shaft extending longitudinally through the receptacle having a hollow perforated portion, a cylindrical sieve surrounding the hollow portion of the shaft beneath the dust-conduit, a worm surrounding the sieve, transporting blades carried by the shaft supporting the sieve and adapted to advance material through the latter, a plurality of blades on the shaft between the sieve and discharge end of the receptacle adapted to advance the contents towards the discharge aperture, a blade on the shaft near the discharge aperture adapted to operate on the contents reversely to the aforesaid blades, and means for throwing said blade into and out of operation.

8. An apparatus of the character described, comprising a fixed slaking receptacle having a charging aperture in one end and a discharge aperture in the opposite end, a. rotatable shaft extending longitudinally through the receptacle, a sieve fixed on the shaft opposite the charging aperture and concentric to the receptacle forming a conical annular space between the sieve and receptacle, a worm on external periphery of the sieve, and transporting blades on the shaft between the sieve and discharge aperture.

In testimony that I claim the foregoing as my invention, I have signed my name in presence of two subscribing witnesses.

WALTER SCHULTHESS.

Witnesses:
ERNST FISCHER,
A. LIEBERKNECHT